United States Patent [19]

Meurer

[11] Patent Number: 5,539,182
[45] Date of Patent: Jul. 23, 1996

[54] PROCESS FOR INCREASING MOISTURE PERMEABILITY OF LEATHER, ESPECIALLY FOR SEATING IN THE AUTOMOBILE INDUSTRY

[75] Inventor: Peter Meurer, Mülheim/Ruhr, Germany

[73] Assignee: Ludw. Lindgens GmbH & Co. KG, Muhlheim/Ruhr, Germany

[21] Appl. No.: 234,520

[22] Filed: Apr. 28, 1994

[30] Foreign Application Priority Data

May 20, 1993 [DE] Germany .......................... 43 16 925.2

[51] Int. Cl.⁶ ................................................. B23K 26/00
[52] U.S. Cl. ................................ 219/121.71; 219/121.84; 219/121.85; 69/21
[58] Field of Search .......................... 219/121.67, 121.7, 219/121.71, 121.72, 121.84, 121.85; 69/21; 264/22, 41, 400; 296/63; 297/463.2; 83/30; 428/224

[56] References Cited

U.S. PATENT DOCUMENTS

| | | | |
|---|---|---|---|
| 3,226,527 | 12/1965 | Harding | 219/121.7 |
| 4,038,513 | 7/1977 | Steigerwald | 219/121.71 |
| 4,121,595 | 10/1978 | Heitmann et al. | 219/121.7 |
| 4,637,206 | 1/1987 | Suwa | 219/121.67 |
| 4,650,955 | 3/1987 | Zaborowski | 219/121.67 |
| 4,743,123 | 5/1988 | Legters | 219/121.7 |

FOREIGN PATENT DOCUMENTS 1-246480  10/1989  Japan.
1261706  1/1972  United Kingdom ............. 219/121.71

Primary Examiner—Teresa J. Walberg
Assistant Examiner—Gregory L. Mills
Attorney, Agent, or Firm—Herbert Dubno

[57] ABSTRACT

A leather layer is burned, preferably under a protective gas blanket, with a laser beam to increase the water vapor permeability for use of the leather in automotive vehicle seats.

3 Claims, 1 Drawing Sheet

PROCESS FOR INCREASING MOISTURE PERMEABILITY OF LEATHER, ESPECIALLY FOR SEATING IN THE AUTOMOBILE INDUSTRY

FIELD OF THE INVENTION

The present invention relates to a process for increasing the water-vapor permeability of leather, especially leathers for use in the automotive-vehicle industry, e.g. for upholstery and the formation of seating surfaces and the like. The invention also relates to the leather layer made by the present process, to the upholstery, i.e. a seating surface in an automotive vehicle composed of the leather thus treated, and, more generally, to the products of the process of the invention.

BACKGROUND OF THE INVENTION

The problem of increasing the moisture permeability of leather has been recognized in the automobile industry in which leather-covered automobile seats, especially cabriolet seats, have been found to have problems resulting from the fact that the leather was not permeable to moisture. As a result of the lack of permeability to water vapor, it was not uncommon for the clothing of the user, because of restricted transpiration, to become wet. As a consequence, it has hitherto been proposed to provide leather layers with perforations, i.e. holes of a diameter of 1.5 mm and more by punching into the leather.

The punching of holes in the leather has, however, the drawback that at the edges of the stamped-out holes, leather fibers tend to protrude from the surface of the leather, through the hole and on the outer surface of the leather seat so that the appearance of the leather seat deteriorates.

OBJECTS OF THE INVENTION

It is, therefore, the principal object of the present invention to provide a process for increasing moisture permeability of leather, especially for use as upholstery in the automobile industry, whereby drawbacks of prior art systems are avoided and, especially, the tendency of the leather to deteriorate in appearance with time is obviated.

Another object of the invention is to provide an improved method of making a leather layer or increasing the permeability of a leather layer to water vapor which, in particular, avoids projection of fibers at the surface of the leather and the deterioration in the appearance of the leather which thus results.

It is an object of the invention to provide an improved method of enhancing the water-vapor permeability in leather which allows the leather to be used for upholstery in automotive vehicles, for example, without disadvantages of earlier leather materials.

SUMMARY OF THE INVENTION

These objects and others which will become apparent hereinafter are attained, in accordance with the invention, by a method of perforating the leather layer utilizing a pulsed laser to burn the holes therein.

The invention is based upon my discovery that the piercing of small holes in a leather layer by a needling operation is disadvantageous since it leads to the appearance of loose fibers at the holes. Apparently as the needle pierces the leather structure, the fibers are elastically pressed away from the needle and, when the needle is withdrawn, these fibers can gradually creep back to obstruct the hole and to appear at the surface of the leather. Surprisingly, when a pulsed laser is used to burn the holes in the leather structure, there is no elastic recovery of fibers or blockage of the holes. The leather structure in the region of the holes appears to be vaporized. The wall and edges of the hole appear, moreover, to be stabilized or fused so that loosening of leather fibers and penetration of them from the hole to the exterior of the leather layer no longer can occur.

Furthermore, using the laser perforation technique, the holes which can be formed are of a significantly smaller diameter than the holes which result by needling or stamping so that the holes do not dominate the appearance of the leather as seen from the outside thereof nor is the leather material weakened. Utilizing the method of the invention, the water-vapor permeability of the leather layer can be increased by a factor of five or more.

The process for increasing the moisture permeability of leather, especially for use as upholstery for automotive vehicles and especially as seat-forming surfaces thereof, can comprise the steps of:

juxtaposing leather layer with at least one laser; and piercing the leather layer through a thickness thereof with a laser beam from the laser to burn a multiplicity of holes in the leather of a diameter and distribution sufficient to increase moisture permeability of the leather.

According to a feature of the invention, a grain leather or a split leather with a thickness of 0.5 to 2.5 mm can be used as the leather layer. Preferably, however, the split leather or grain leather should have a thickness of 1 to 1.3 mm.

The diameter of the holes is determined by a particular laser used and advantageously the hole diameter will range between 60 and 1000 μm. Smaller holes cannot practically be made because of limits on the diameters of the laser beams. Advantageously the hole diameter to be burned into leather is between 80 and 100 μm, such holes being practically invisible in the leather.

The hole spacing can be limited only by the hole diameter and the strength of the leather. Optimally the interhole spacing should be 2 to 5 mm.

Preferably before the holes are burned into the leather, the outer side of the leather layer is dressed with an acrylate and/or polyurethane coating, thereby avoiding a blockage of the perforations by an after-applied dressing. According to a feature of the invention, the holes are burned into the leather from the back side thereof thereby minimizing any influence of the esthetics of the external surface. The holes can preferably be burned into the leather layer under a protective gas, especially carbon dioxide, applied as a blanket to the leather layer to minimize the burning of the leather at the edges of the holes because of the availability of oxygen. Carbon dioxide lasers are best used.

The invention also includes the seating of an automotive vehicle which embodies the materials made by the method of the invention and the high moisture permeability leather products thus made.

BRIEF DESCRIPTION OF THE DRAWING

The above and other objects, features, and advantages will become more readily apparent from the following description, reference being made to the accompanying drawing in which.

SPECIFIC DESCRIPTION AND EXAMPLE

Figure 1:
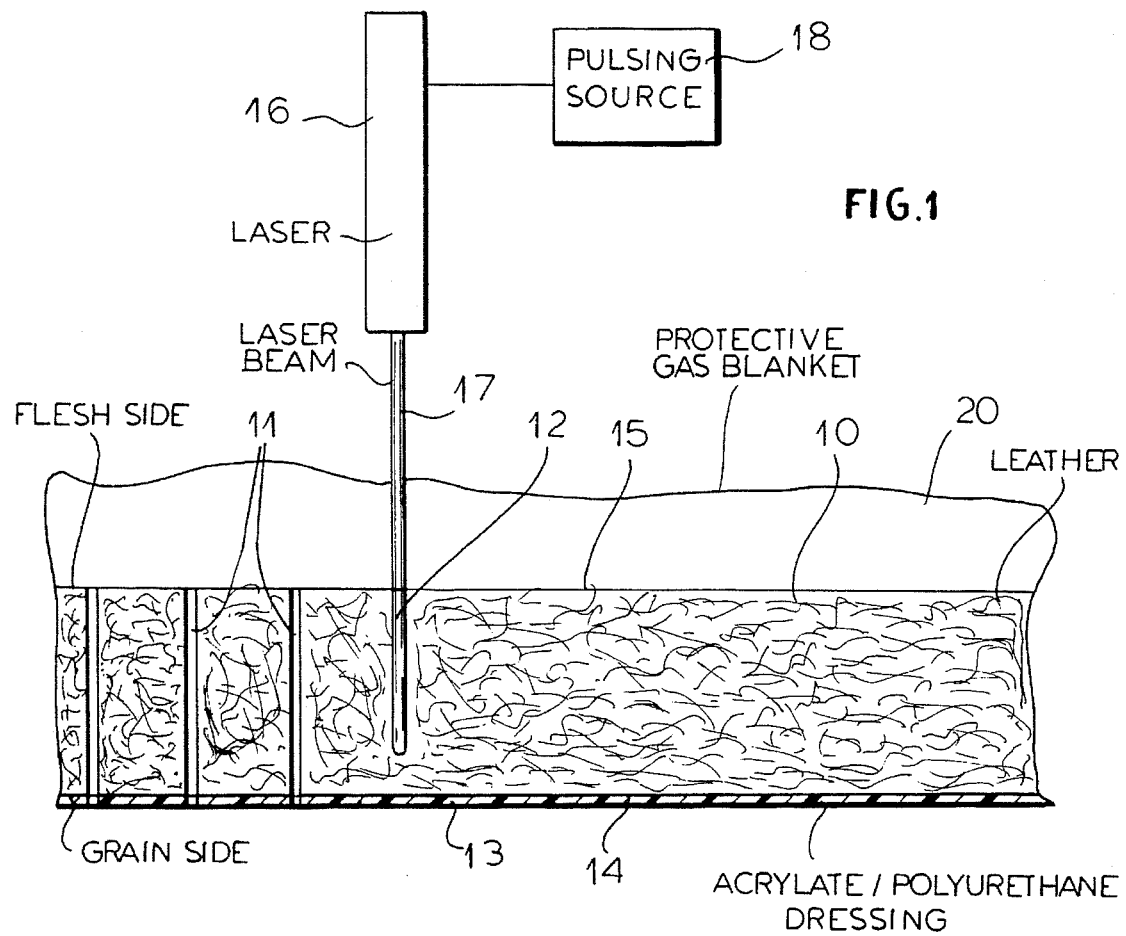
FIG. 1 is a diagrammatic sectional view showing the formation of perforations by laser beams in the leather according to the leather.

In FIG. 1 of the drawing I have shown, highly diagrammatically, a leather layer 10 having a grain side 14 and a back side or flesh side 15, e.g. a grain leather, which is provided with an acrylate/polyurethane dressing 13 before piercing of the leather with a laser beam 17 from a carbon dioxide laser 16 which is pulsed by a pulsing power source 18. The holes 11 are burned through the leather from the flesh or back side and a hole 12 is shown in the process of being burned through the thickness of the lather.

Figure 2:
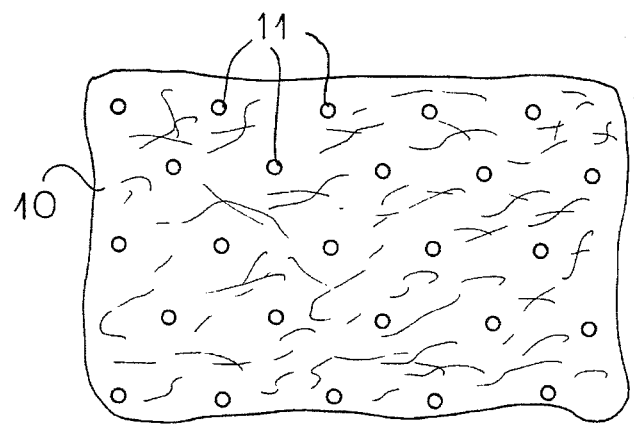
FIGS. 2 is a diagrammatic plan view of the material produced by the method of the invention.

As a result, the leather layer 10 has an array of spaced-apart practically invisible perforations as shown from the grain side of the leather in FIG. 2 which represents the finished material. This material may be an upholstery on an automotive vehicle seat.

By way of an example, a grain leather having a thickness of about 1 mm is dressed on its outer or grain side by the application of a conventional polyurethane leather coating or dressing thereto. The leather is pierced with a laser beam from a 120 watt pulsed carbon dioxide laser under a blanket 20 of protective gas, e.g. carbon dioxide, from the back side to form holes with a diameter of about 90 µm at uniform spacing as an interhole distance of 4 mm. The resulting leather layer had a water vapor permeability of about 2.5 mg/cm$^2$h or about five times greater than that of the unperforated leather. The moisture permeable leather was used to fabricate automobile seats which were capable of transportation and convertible for the user.

I claim:

1. A method of making automobile seating comprising the steps of:
   (a) providing a natural grain leather layer having a thickness of 1 to 1.3 mm;
   (b) dressing an outer side of said natural grain leather layer;
   (c) thereafter burning from a back side of said layer a multiplicity of holes through said natural grain leather layer of diameters of 80 to 100 µm with an interhole spacing of 2 to 5 mm with a pulsed laser to form a laser-perforated leather upholstery material having enhanced moisture permeability; and
   (d) thereafter fabricating an automobile seat from said laser-perforated leather upholstery material.

2. The method defined in claim 1 wherein the burning from a back side of said layer of said multiplicity of holes through said natural grain leather layer is effected under a blanket of carbon dioxide as a protective gas.

3. The method defined in claim 2 wherein a carbon dioxide laser is used as the pulsed laser.

* * * * *